(12) United States Patent
Talir et al.

(10) Patent No.: US 8,152,065 B2
(45) Date of Patent: Apr. 10, 2012

(54) HAND CONTROLLER FOR CONTROLLING A LONG-RANGE SENSING SYSTEM OF A WEAPONS SYSTEM

(75) Inventors: Robert Talir, Florissant, MO (US); Thomas Linton, Lake Saint Louis, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 385 days.

(21) Appl. No.: 12/435,620

(22) Filed: May 5, 2009

(65) Prior Publication Data

US 2010/0282844 A1  Nov. 11, 2010

(51) Int. Cl.
*G06F 19/00* (2006.01)

(52) U.S. Cl. ......... 235/404; 235/405; 235/407; 235/400

(58) Field of Classification Search .................. 235/404, 235/405, 407, 400
See application file for complete search history.

(56) References Cited

U.S. PATENT DOCUMENTS

| | | | |
|---|---|---|---|
| 2,938,435 A * | 5/1960 | Gille ............................. 89/41.12 |
| 3,575,085 A | 4/1971 | McAdam, Jr. |
| 3,576,302 A | 4/1971 | Palfreyman |
| 3,604,866 A | 9/1971 | Darvasi |
| 4,326,340 A | 4/1982 | Blomqvist et al. |
| 4,558,627 A | 12/1985 | LeBlanc et al. |
| 4,686,888 A | 8/1987 | Sanborn et al. |
| 5,566,087 A | 10/1996 | Voigt et al. |
| 5,668,359 A | 9/1997 | Alvord et al. |
| 5,801,771 A | 9/1998 | Ohwaki et al. |
| 5,829,745 A | 11/1998 | Houle |
| 5,882,206 A | 3/1999 | Gillio |
| 6,237,462 B1 | 5/2001 | Hawkes et al. |
| 6,259,433 B1 | 7/2001 | Meyers |
| 6,869,233 B2 | 3/2005 | Westerweck et al. |
| 6,892,102 B1 | 5/2005 | Fushimi |
| 7,106,300 B2 | 9/2006 | Saylor et al. |
| 2005/0263000 A1 | 12/2005 | Hill |
| 2008/0288093 A1 | 11/2008 | Kamenster et al. |
| 2009/0007684 A1 | 1/2009 | Kurtz et al. |

FOREIGN PATENT DOCUMENTS

| | | |
|---|---|---|
| EP | 1133265 | 7/2004 |
| WO | WO0025093 | 5/2000 |

* cited by examiner

*Primary Examiner* — Karl D. Frech
(74) *Attorney, Agent, or Firm* — Kilpatrick Townsend & Stockton LLP

(57) ABSTRACT

A hand controller for controlling an electro-optic sensor of a weapons system may include a first cam/spring mechanism configured to provide non-linear displacement to an operator applying a torque to rotate the hand controller in a first direction. A second cam/spring mechanism may be configured to provide non-linear displacement to an operator applying a torque to rotate the hand controller in a second direction. A first sensor may be configured to sense torque being applied in the first direction and to generate a command signal to control rotation of the electro-optic sensor in the first direction. A second sensor may be configured to sense torque being applied in the second direction and to generate a command signal to control rotation of the electro-optic sensor in the second direction. The command signals may be substantially mathematically proportional rate command signals with respect to applied torque.

22 Claims, 10 Drawing Sheets

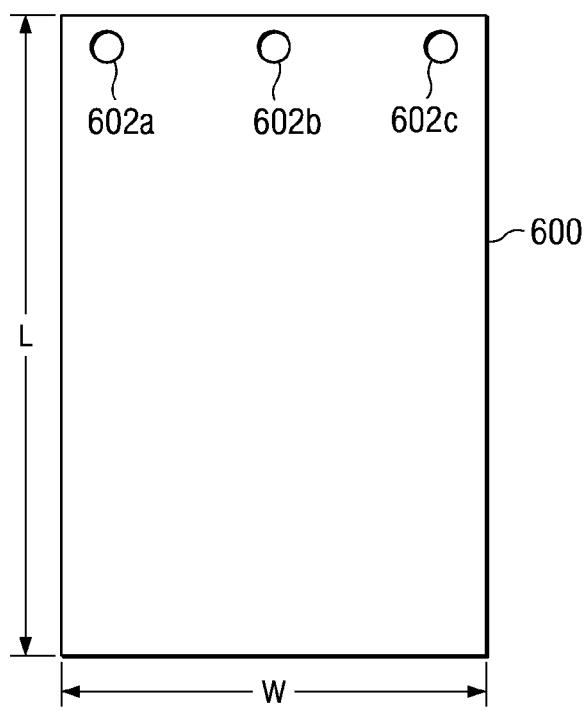
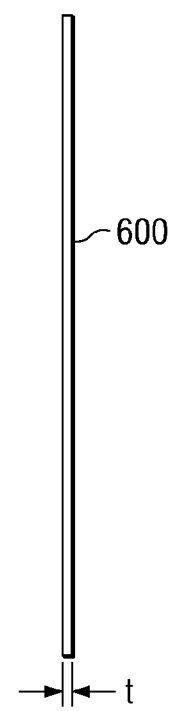
*FIG. 6A*
*FIG. 6B*
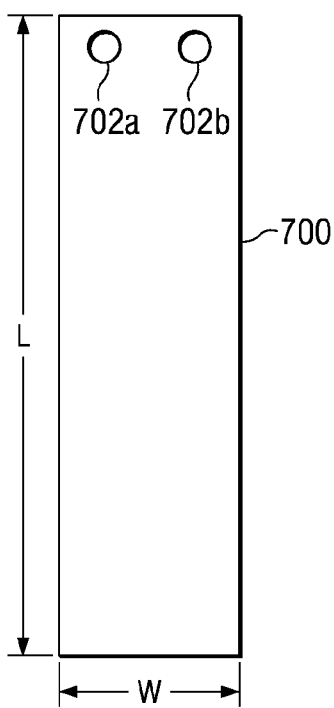
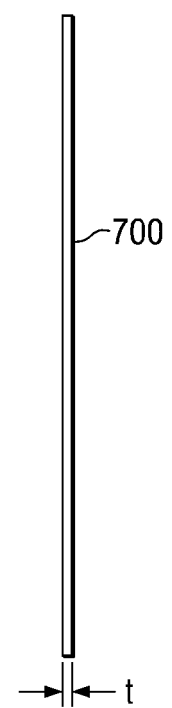
*FIG. 7A*
*FIG. 7B*

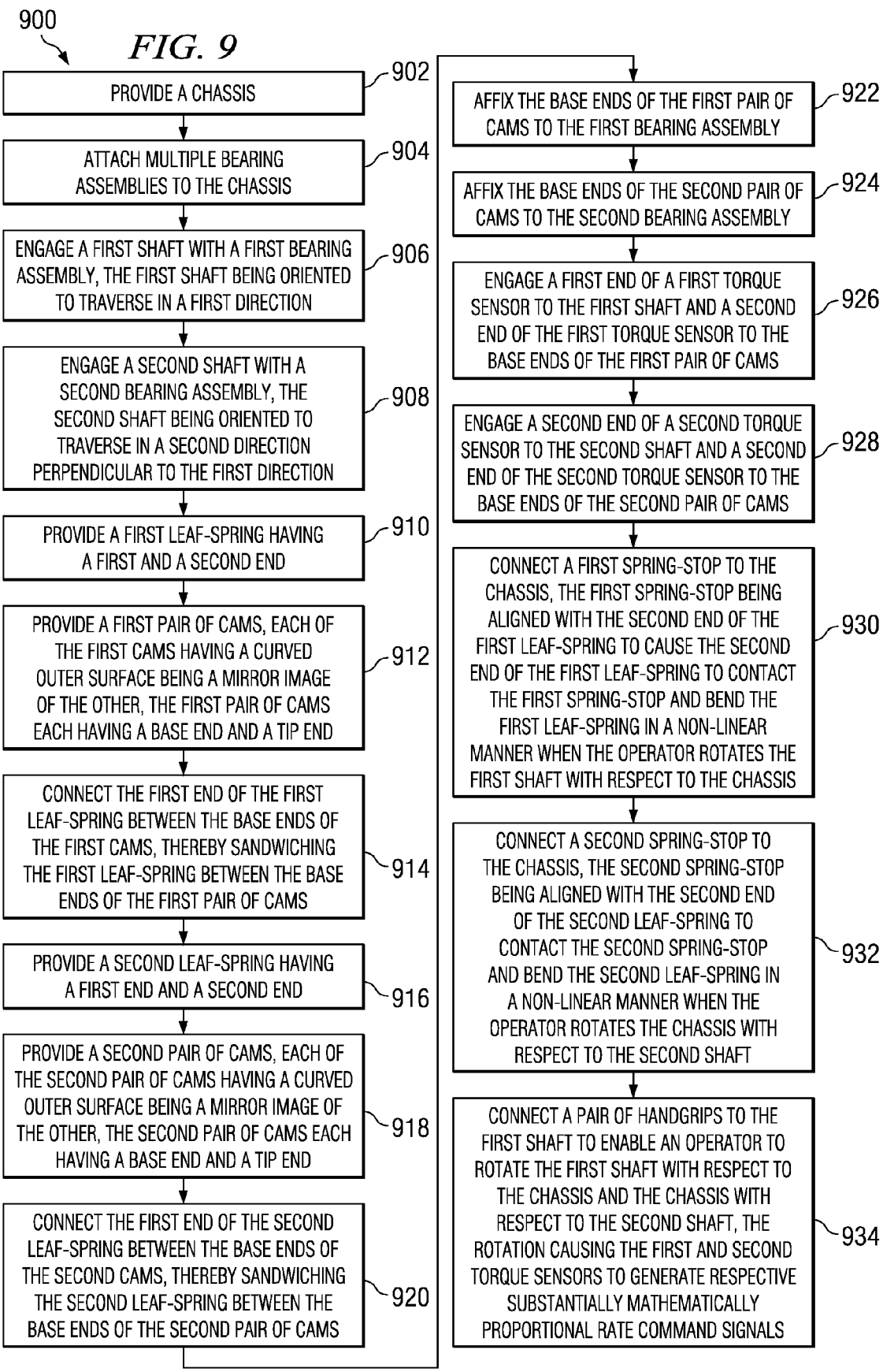

US 8,152,065 B2

HAND CONTROLLER FOR CONTROLLING A LONG-RANGE SENSING SYSTEM OF A WEAPONS SYSTEM

BACKGROUND

Military weapons systems are inherently dangerous for a variety of reasons. Military personnel or operators who operate short-range and long-range weapons who are required to be physically located at the weapons are exposed to snipers, shrapnel, roadside bombs, and other enemy weapons. Even if the weapons systems are carried on a military personnel carrier, (e.g., tank or Humvee), if the operator is required to be outside the confines of the military personnel carrier, then there is a higher risk of injury or death than if the operator were able to operate the weapons system or sensing system (e.g., electro-optical system) remotely from inside the personnel carrier.

As military weapons have improved over the years, one form of improvement has been to remotely control sensing systems (e.g., imaging, laser, and other electro-optical sensing systems) of weapons systems. While remotely controlling sensing systems of weapons systems is advantageous from a safety perspective, control and accuracy of the sensing systems have suffered for a variety of reasons. First, weapons systems must perform under rigorous conditions, such as on moving vehicles. Second, situational performance of weapons systems must comply with rigorous operational specifications, such as being able to track long-range targets moving at relatively slow speeds. In tracking long-range targets, the sensing systems are required to provide very accurate pointing and low-rate tracking, such as 0.005 degrees per second for a certain period of time (e.g., 30 seconds), yet also provide for high rate slewing (e.g., 60 degrees per second) to enable an operator to react to targets at different locations and ranges from the weapons systems. Third, a hand controller has to provide an operator with easy, intuitive control and "feel" to minimize training time and effectiveness during combat situations.

Hand controllers for controlling sensing systems of weapons systems that operate under the operational parameters described above have traditionally produced non-linear outputs, which makes the job of operators difficult as these non-linear controllers produce "unpredictable" and non-intuitive results. For example, a hand controller that produces a 10 degree per second slew rate output for one foot-pound of torque operator input (i.e., 10:1 slew rate) and a 40 degree per second slew rate output for two foot-pounds of torque operator input (i.e., 20:1 slew rate) is difficult to control even for experienced operators due to producing a non-linear slew rate output. Ultimately, controllability of a sensing system of a weapons system is a function of operator "feel" in using a hand controller.

SUMMARY

To overcome the problems of traditional hand controllers for controlling sensing systems of weapons systems, the principles of the present invention provide for a hand controller that is configured with two cam/spring mechanisms to control an electro-optic sensor of a weapons system by generating a slew rate input command that is mathematically proportional with respect to operator-applied torque or force and non-linear with respect to displacement feedback (e.g., applying a torque input to the hand controller). In one embodiment, the cam/spring mechanisms include a pair of cams that sandwich a leaf-spring, which may be formed of two leaf-springs. The two cams, when rotated, may cause the leaf-spring to resist rotation in a non-linear manner by bending, thereby causing the non-linear displacement response feedback. Torque sensors may be used for measuring torque being applied by an operator to the hand controller, and generate mathematically proportional slew rate commands to drive gimbals that control position of the electro-optic sensor. In one embodiment, the hand controller is a two-handed, yoke style hand controller that is configured to provide for rotational ranges in the azimuth (AZ) and elevation (EL) directions that are comfortable for an operator, such as ranges of +/−25 degrees.

One embodiment of a hand controller for controlling an electro-optical sensor of a weapons system may include a chassis, an azimuth shaft, and an elevation shaft. A first leaf-spring may have a first end and a second end. A first pair of cams may include base ends and tip ends, where each of the first pair of cams have a curved outer surface that is a mirror image of the other. The first pair of cams may be configured with each of the respective curved outer surfaces being in opposition with one another when the base ends are fastened to the azimuth shaft and to the first end of the first leaf-spring, thereby clamping the first end of the first leaf-spring between the cams and extending the first leaf-spring between the curved outer surfaces of the first pair of cams. A first spring-stop may be connected to the chassis and positioned at the second end of the first leaf-spring to apply a rotational force to the second end of the first leaf-spring, thereby causing said first leaf-spring to bend in response to rotation of the chassis with respect to the azimuth shaft. A first torque sensor may be fastened to the azimuth shaft and the first pair of cams to sense rotational force applied by an operator to the azimuth shaft with respect to resistance from the first leaf-spring, and to generate a first rate command signal. A second leaf-spring may have a first end and a second end. A second pair of cams may include base ends and tip ends, where each of the second pair of cams have a curved outer surface that is a mirror image of the other. The second pair of cams may be configured with each of the respective curved outer surfaces being in opposition with one another when the base ends are fastened to the elevation shaft and to the first end of the second leaf-spring, thereby clamping the first end of the second leaf-spring between the cams and extending the second leaf-spring between the curved outer surfaces of the second pair of cams. A second spring-stop may be connected to the chassis and positioned at the second end of the leaf-spring to prevent rotation of the second leaf-spring, thereby causing the second leaf-spring to bend in response to rotation of the elevation shaft with respect to the chassis. A second torque sensor may be fastened to the elevation shaft and the second pair of cams to sense rotational force applied by an operator to the elevation shaft with respect to resistance from the second leaf-spring, and to generate a second rate command signal. The first and second rate command signals may be utilized to control position of the electro-optical sensor of the weapons system.

One method for remotely controlling a component of a weapons system using a hand controller may include generating a substantially mathematically proportional rate command to control position of the component of the weapons system in the azimuth direction in a mathematically proportional response a torque input from an operator of the weapons system in the azimuth direction. In response to receiving a torque input from the operator in the elevation direction, generating a substantially mathematically proportional rate command to control position of the component of the weapons system in the elevation direction. The hand controller may respond to the torque inputs by the operator by providing a non-linear position displacement response in both the azimuth and elevation directions.

One method of manufacturing a hand controller may include providing a chassis, attaching multiple bearing assemblies to the chassis. A first shaft may be engaged with a first bearing assembly, the first shaft being oriented to traverse in a first direction, and a second shaft may be engaged with a second bearing assembly, the second shaft being oriented to traverse in a second direction perpendicular to the first direction. A first leaf-spring having a first and a second end may be provided. A first pair of cams may also be provided, where each of the first cams have a curved outer surface being a mirror image of the other, and where the first pair of cams each have a base end and a tip end. The first end of the first leaf-spring may be connected between the base ends of the first cams, thereby sandwiching the first leaf-spring between the base ends of the first pair of cams. A second leaf-spring having a first end and a second end may be provided. A second pair of cams may also be provided, each of the second pair of cams may have a curved outer surface being a mirror image of the other, and where the second pair of cams each have a base end and tip end. The first end of the second leaf-spring may be connected between the base ends of the second cams, thereby sandwiching the second leaf-spring between the base ends of the second pair of cams. The base ends of the first pair of cams may be affixed to the first shaft, and the base ends of the second pair of cams may be affixed to the second shaft. A first end of a first torque sensor may be engaged to the first shaft and a second end of the first torque sensor may be engaged to the base ends of the first pair of cams. A second end of a second torque sensor may be engaged to the second shaft and a second end of the second torque sensor may be engaged to the base ends of the second pair of cams. A first spring-stop may be connected to the chassis, the first spring-stop being aligned with the second end of the first leaf-spring to cause the second end of the first leaf-spring to contact the first spring-stop and bend the first leaf-spring in a non-linear manner when the operator rotates the first shaft with respect to the chassis. A second spring-stop may be connected to the chassis, the second spring-stop being aligned with the second end of the second leaf-spring to contact the second spring-stop and bend the second leaf-spring in a non-linear manner when the operator rotates the chassis with respect to the second shaft. A pair of handgrips may be connected to the first shaft to enable an operator to rotate the first shaft with respect to the chassis and the chassis with respect to the second shaft, the rotation causing the first and second torque sensors to generate respective substantially mathematically proportional rate command signals.

Another embodiment of a hand controller for controlling an electro-optic sensor of a weapons system may include a first cam/spring mechanism configured to provide non-linear displacement to an operator applying a torque to rotate the hand controller in a first direction. A second cam/spring mechanism may be configured to provide non-linear displacement to an operator applying a torque to rotate the hand controller in a second direction. A first sensor may be configured to sense torque being applied in the first direction and to generate a command signal to control rotation of the electro-optic sensor in the first direction. A second sensor may be configured to sense torque being applied in the second direction and to generate a command signal to control rotation of the electro-optic sensor in the second direction. The command signals may be substantially mathematically proportional rate command signals with respect to applied torque.

BRIEF DESCRIPTION

Illustrative embodiments of the present invention are described in detail below with reference to the attached drawing figures, which are incorporated by reference herein and wherein:

FIGS. 6A and 6B are schematics of an illustrative leaf-spring used for controlling azimuth rotation of a hand controller;

FIGS. 7A-7B are schematics of an illustrative leaf-spring for controlling elevation for rotation of a hand controller;

FIG. 9 is a flow diagram of an illustrative process for manufacturing a hand controller in accordance with the principles of the present invention.

DETAILED DESCRIPTION

Figure 1:
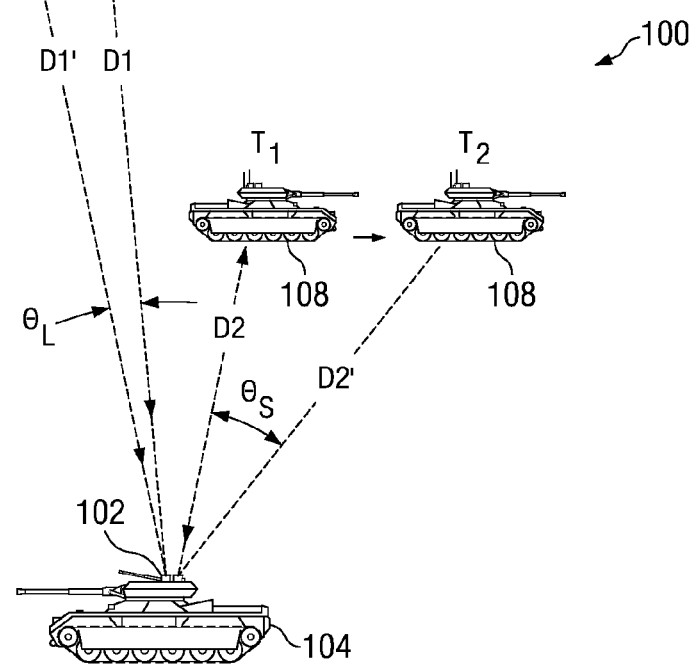
FIG. 1 is an illustration of an illustrative environment in which a weapons system that utilizes a hand controller in accordance with the principles of the present invention operates.

With regard to FIG. 1, an illustrative battlefield environment 100 in which a weapons system 102 mounted on a military personnel carrier 104, such as a tank, Humvee, or other piece of military equipment, is used to track and/or attack enemy targets, such as tanks 106 and 108. As understood in the art, an operator of the weapons system 102 targeting enemy targets at different distances $D_1$ and $D_2$ have to contend with different angular slew rates as the personnel carrier 104 changes position with respect to enemy position over time or as the enemy position changes with respect to the personnel carrier 104 over time. As shown, an enemy tank 106 at time $T_1$ moves to a different position at time $T_2$. The change in position causes a change in long-range angle $\theta_L$. Similarly, an enemy tank 108 at time $T_1$ moves to a position at time $T_2$ that causes a short-range angular change $\theta_S$ with respect to the personnel carrier 104. As the difference in times $T_1$ and $T_2$ are the same for each of the different enemy tanks 106 and 108, the difference in angular position $\theta_L$ and $\theta_S$ is different due to the different distances $D_1$ and $D_2$, respectively, of the enemy tanks 106 and 108 with respect to the personnel carrier 104. As such, an operator of the weapons system 102 is required to track each of the different enemy tanks at a different angular slew rate. For the long-range angular change $\theta_L$, the operator controls a component (e.g., sensor) of the weapons system 102 with a small angular slew rate. For the short-range angular change $\theta_S$, the operator controls a component of the weapons system 102 with a larger angular slew rate. So as to provide an operator of the weapons system 102 with the ability to control the component of the weapons system at the different slew rates, a hand controller that provides mathematically proportional rate commands to operator-applied torque while also providing a non-linear displacement feedback for controlling the component of the weapons system 102 may be provided for the operator to have better overall control of the component of the weapons system, as further described herein. The substantially mathematically proportional rate commands are substantially linear rate commands with respect to torque input by an operator. For simplicity, the torque input from the operator is considered to be a linear input.

Figure 2:
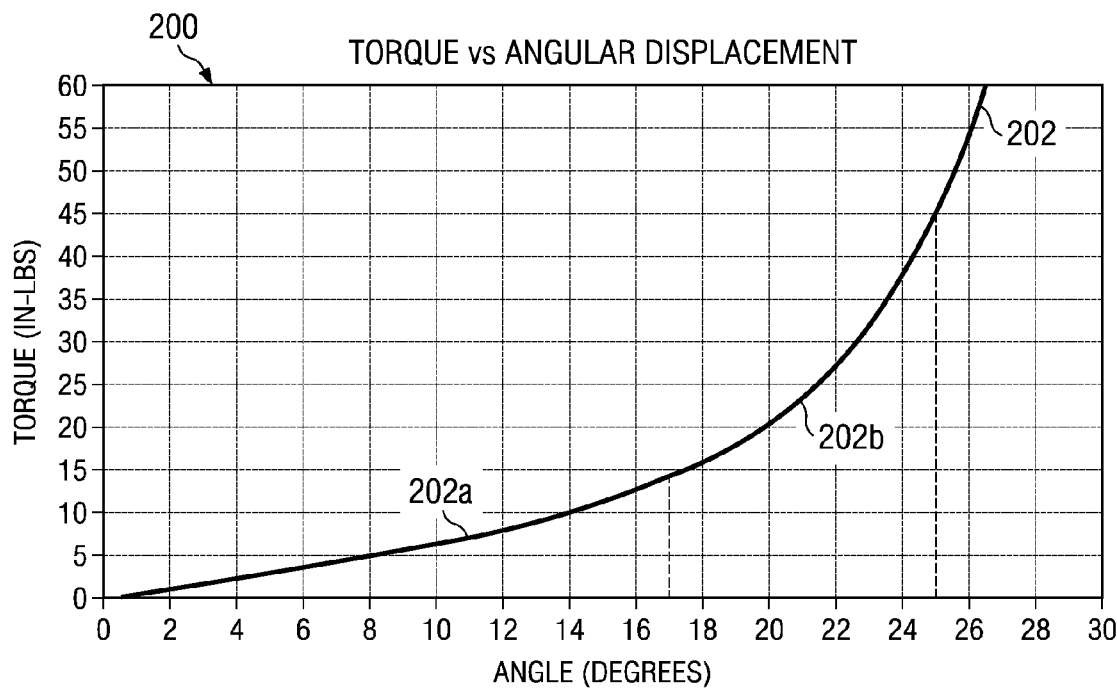
FIG. 2 is a graph of an illustrative torque versus angular displacement curve to which a hand controller is to operate to provide for functionality that supports an operator of a weapons system during combat engagement and is capable of providing functionality as provided by the principles of the present invention.

With regard to FIG. 2, a graph 200 is shown to display an illustrative torque versus angular displacement curve 202. The torque versus angular displacement curve 202 provides an operator of a weapons system with a non-linear relationship between torque input and angular displacement of a gimbaled component of the weapons system. The torque versus angular displacement curve 202 is shown to include two sections, a first, relatively linear section 202a and a second, non-linear section 202b. The relatively linear first section 202a is described by a torque input from an operator of between zero and approximately 15 inch-pounds (in-lbs), which causes an angular displacement of between zero and approximately 17 degrees of angular movement of a hand controller and, consequently, a component of the weapons system. Between approximately 15 and 25 inch-pounds of torque applied to the hand controller by the operator as shown in curve portion 202b is non-linear, which means that the operator of the hand controller is to apply increasingly higher torque in a non-linear fashion to achieve angular rotations of between approximately 17 degrees and 25 degrees of the hand controller and component of the weapons system. The amount of torque that is applied to the hand controller for the operator to achieve the different angles of the component of the weapons system provides the operator with a torque and position feel feedback that is relatively natural as the hand controller, in accordance with the principles of the present invention, may produce a mathematically proportional rate command signal with respect to the torque input. The mathematically proportional rate command signal, which is used to control gimbals to which the component of the weapons system is mounted, may be generated by a torque sensor that senses the amount of torque being applied by an operator to the hand controller. By providing a (i) substantially mathematically proportional rate command with respect to torque input and (ii) non-linear displacement feedback to the operator by the hand controller, the operator of the weapons system is able to achieve both accurate tracking of long-range targets at or around boresight and high angular slew rate for closer range targets. Although described as a mathematically proportional rate command, it should be understood that the rate command is limited to being substantially mathematically proportional due to physical and electrical constraints, as understood in the art.

Figure 3:
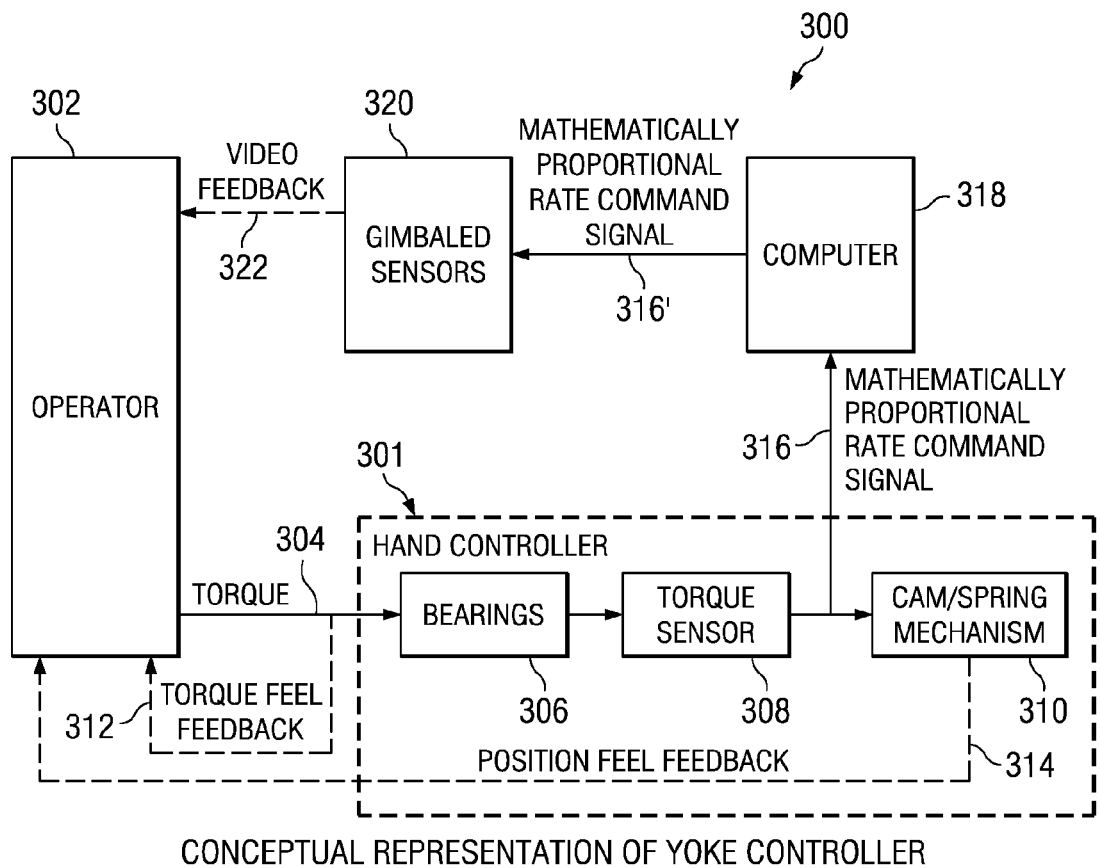
FIG. 3 is a block diagram of an illustrative control system utilizing a hand controller for controlling gimbals of a sensor of a weapons system.

With regard to FIG. 3, an illustrative control system 300 that includes a hand controller 301 for remotely controlling a weapons system or component thereof is shown. The control system 300 is representative of a control system for a single rotational direction (e.g., azimuth), and a second control system with the same or analogous configuration may be used for a second rotational direction (e.g., elevation). The control system 300 may include an operator 302 who operates the weapons system who applies a torque 304 to the hand controller 301. The torque 304 may be applied by hands of the operator 302. In one embodiment, the hand controller 301 is a two handed, yoke-type hand controller that provides for remote control of a two axis powered gimbaled pointing system that points electro-optical sensors of a weapons system. Although described as a weapons system, it should be understood that the principles of the present invention may similarly be utilized for a surveillance system or any other systems that include electro-optical sensors. It should also be understood that the hand controller may also be utilized in control of a weapons system itself as opposed to electro-optical sensors or other components that are part of the weapons system.

The hand controller 301 may include bearings 306 that provide for low friction to enable an operator to control the hand controller 301 as smoothly as possible. The bearings 306 minimize friction in vicinity of boresight or the zero position and make hysteresis minimal so as to further enable the operator to more easily control the hand controller 301 when changing directions. In one embodiment, the bearings have part numbers SSRI1812LLRA5P25LT156 and SSRI1212ZZRA7P25L01. One or more sets of bearings 306 may be utilized to reduce friction for rotation of each shaft (not shown) that is used to provide rotation along azimuth and elevation directions of the hand controller 301.

A torque sensor 308 may be configured in line with the bearings 306 and shaft and be connected to or otherwise be in mechanical communication with cam/spring mechanism 310. The torque sensor 308 may operate to sense the torque 304 being applied to the hand controller 301 via hand grips (not shown) or otherwise by sensing a rotational differential across the torque sensor formed by the torque 304 being applied to the hand grips or otherwise and resistance force created by the cam/spring mechanism 310. In other words, the cam/spring mechanism 310 prevents free rotation of a shaft by resisting rotation in a non-linear manner, thereby creating a strain across the torque sensor 308 which, in response to the strain being created, senses the strain via strain gauge(s), which are part of the torque sensor 308.

The operator 302 is provided with two different "feel" feedbacks when operating the hand controller 301. A first feel feedback is a torque feel feedback 312 that is provided simply by the operator rotating the hand controller 301. A second feel feedback is a position feel feedback 314 that is provided as a result of the cam/spring mechanism 310 when resisting the torque 304 being applied by the operator 302. As the operator rotates the hand controller farther in angle, more resistance is provided by the cam/spring mechanism 310 thereby allowing the operator to feel the position of the hand controller based on the increased resistance to the torque input. The torque sensor 308, in response to sensing a strain differential applied across the torque sensor 308 (ie., one side of the torque sensor 308 being rotated by the operator 302 and the other side of the torque sensor 308 being counter-rotated by the cam/spring mechanism 310), the torque sensor 308 generates a mathematically proportional rate command signal 316. The mathematically proportional rate command signal 316 is generated by strain gauges in the torque sensor 308 and is communicated to a computer or processor 318 that processes the mathematically proportional rate command signal 316. The mathematically proportional rate command signal 316 may include noise or other electrical signal artifacts that the computer 318 filters from the mathematically proportional rate command 316 to create a mathematically proportional rate command signal 316', as understood in the art. The mathematically proportional rate command signal 316' is used to drive gimbaled sensors 320, where the gimbaled sensors may be electro-optical sensors (e.g., camera) that are controlled in position and rotation by electromechanical gimbals. The electromechanical gimbals may include any motor or other electromechanical mechanism that is capable of rotating position of a sensor. The mathematically proportional rate command signal 316' causes the electromechanical mechanism of the gimbaled sensors 320 rotate at a mathematically proportional rate as a function of the mathematically proportional rate command signal 316'.

As a result of the gimbaled sensors 320 rotating as a function of the mathematically proportional rate command signal 316', a video feedback 322 is provided to the operator 302 by displaying an image or other sensory response from the gimbaled sensor 320 being rotated, thereby providing the operator 302 with a visual sense of feel of the gimbaled sensor 320 caused by the torque 304 that the operator 302 is applying to the hand controller 301. As previously described, the hand controller 301 may include two different sets of bearings, torque sensors, and cam/spring mechanisms to enable the operator 302 to control the gimbaled sensors 320 in both the azimuth and elevation directions, as further described herein.

Figure 4A:
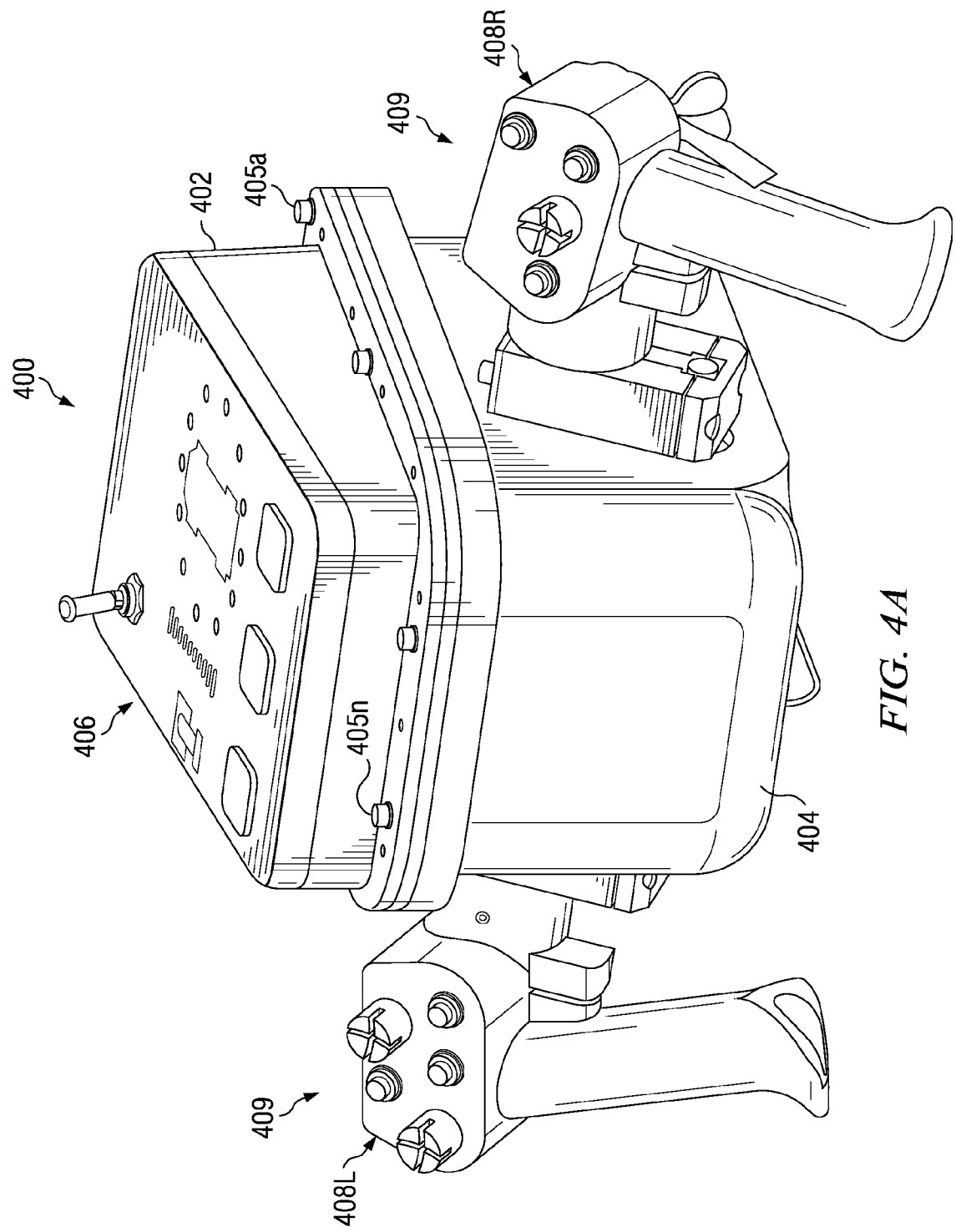
FIG. 4A is an illustration of an illustrative hand controller in which the principles of the present invention are incorporated.

With regard to FIG. 4A, an isometric view of an illustrative hand controller 400 is shown. The hand controller 400 may include a housing formed by an upper housing 402 and a lower housing 404 that are connected by fasteners 405a-405n, such as screws, bolts, or any other means for fastening the upper and lower housings 402 and 404. A controller interface 406 may reside on top of the upper housing 402 that enables an operator to power on and off the hand controller and sensor(s) of a weapons system being controlled by the hand controller 400, adjust resolution of the sensor, zoom of the sensor, and any other function that may assist the operator with controlling the sensor or hand controller 400 in accordance with the principles of the present invention. The hand controller 400 may further include left and right hand grips 408L and 408R, respectively. As shown, the hand controller 400 is a yoke-style hand controller that is consistent with other types of hand controllers commonly found in weapons systems. Each of the hand grips may be provided with thumb activated control mechanisms 409, such as push buttons or thumb wheels, that enables an operator to activate various aspects of the weapons system that the hand controller 400 is being utilized to control. For example, the push buttons 409 may include a "fire" button that causes the weapons system to fire ammunition, turn on a laser that is utilized in conjunction with another weapons system that shoots ammunition into a location that the laser is pointed, or zoom in or out the sensor(s).

Figure 4B:
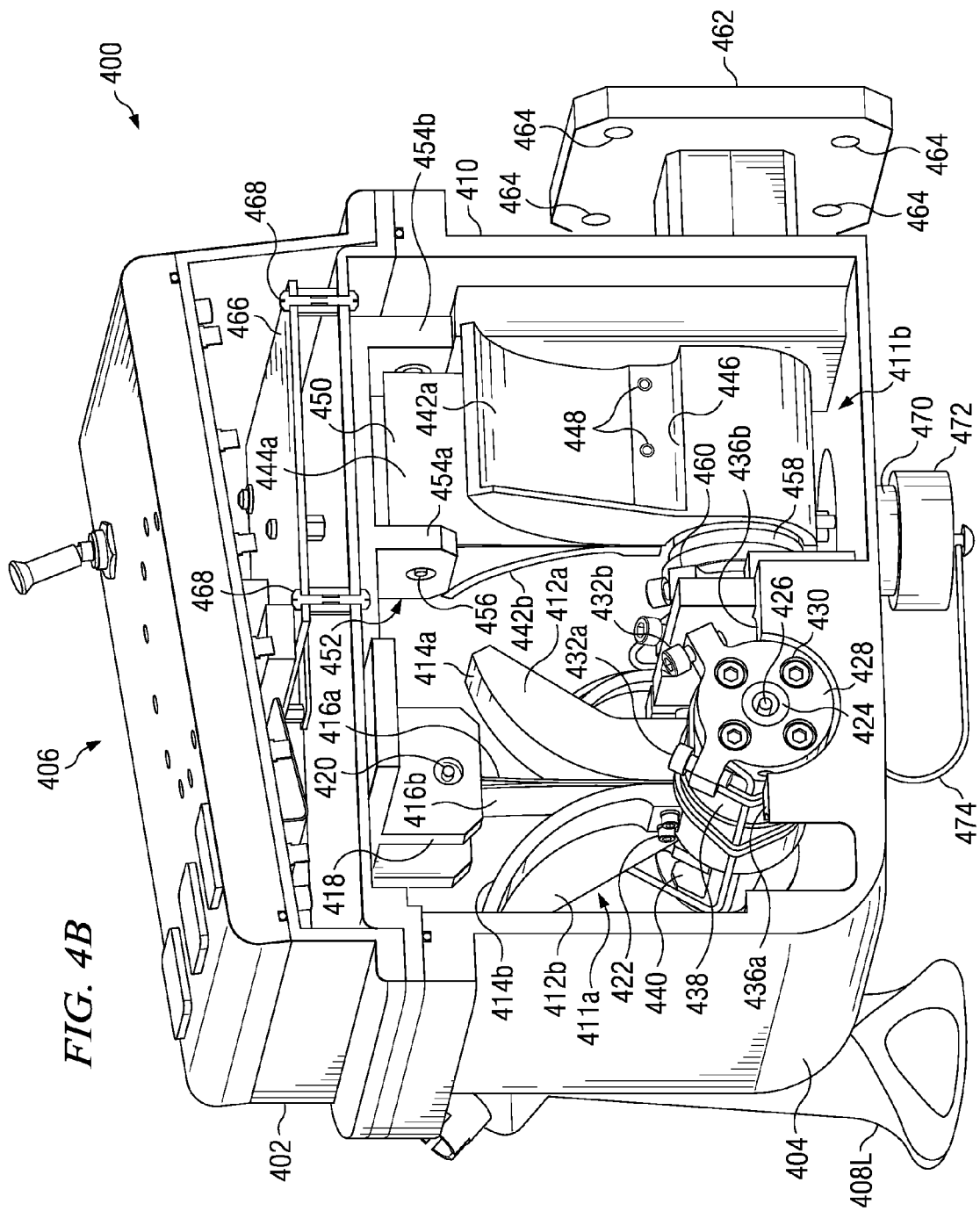
FIG. 4B is a sectional view of the hand controller of FIG. 4A showing illustrative internal components for providing mathematically proportional rate control and non-linear displacement response in response to a torque input by an operator.

With regard to FIG. 4B, the hand controller 400 of FIG. 4A with the right hand grip 408R and right side of the upper and lower housings 402 and 404 being removed to reveal internal components of the hand controller 400. A chassis 410 is a structural element that forms the basis of the hand controller 400 to which other components are mounted. The chassis 410 may be formed of steel or other suitably stiff material, as understood in the art.

Cam/Spring mechanisms 411a and 411b (collectively 411) may be connected to the chassis. Cam/spring mechanism 411a operative in the elevation direction may include a pair of cams 412a and 412b (collectively 412) have a curved outer surface 414a and 414b (collectively 414), respectively, that are mirror images of one another. In one embodiment, the curved outer surfaces 414 have a circular shape. Alternative shapes may be utilized to provide different non-linear displacement response to an operator who applies a force to the hand controller 400. A leaf-spring 416 is formed of a pair of leaf-springs 416a-416b. The leaf-spring 416 is connected to the cams 412 on one end (base end) and in contact with a spring-stop 418 on the other end (tip end). In connecting the leaf-spring 416 to the cams 412, the leaf-spring 416 is clamped between the cams 412, a portion of the leaf-spring that is connected between the opposing cams may be considered to be clamped or sandwiched between the cams. In one embodiment, the spring-stop 418 includes a rotational member 420 that is positioned between the pair of leaf-springs 416a and 416b. The spring-stop 418 is coupled to the chassis 410 and prevents the tip end of leaf-spring 416 from rotating when the leaf-spring 416 is attempted to be rotated by the cams 412. The cams 412 may connect to the base end of the spring-leaf 416 by use of fasteners 422 that extend through base portions 423 of the cams 412 and the base end of the spring-leaf 416.

A shaft 424 extends horizontally across the hand controller 400 and is connected to the hand grips 408L and 408R. The shaft 424 enables an operator to rotate the hand grips 408 in an elevation direction (i.e., forward and backwards with respect to the orientation of the hand grips 408). The shaft 424, in one embodiment, is a hollow tube that enables wiring 426 to pass therethrough. The shaft 424 may connect the hand grips 408L and 408R together (see FIG. 4E). A stop member 428 may be connected to the shaft 424 and/or handle 408R using an adhesive and/or fastening member, such as screws or bolts 430. Configured on the stop member 428 are two adjustable stop members 432a and 432b (collectively 432) that are connected to the stop member 428. In this case, the adjustable stop members 432 are set screws that extend through extension members 434a and 434b, respectively. When the stop member 428 is rotated, one of the adjustable stop members 432 to contacts a stop surface 436a or 436b, thereby preventing further rotation of the stop member 428 and, simultaneously, the shaft 424. The stop members 432 may be adjusted to limit rotation of the stop member 428 to pre-established angles, such as +/−25 degrees, which are comfortable limits for the operator to flex or roll his or her wrists and arms. The stop members 432 also limit the maximum torque that may be generated by the operator. In one embodiment, the maximum torque in the elevation direction may be 45 in-lbs. A higher maximum torque may be established in the azimuth direction.

A torque sensor 438 may be connected to the stop member 428 via the fastening members 430. In one embodiment, the torque sensor 438 is a hollow tube having flanges (not shown) on each end of the torque sensor 438 to enable the torque sensor 438 to connect to different components, such as the stop member 428 and cams 412. It should be understood that alternative shapes and configurations of the torque sensor 438 may be utilized. The torque sensor 438 being hollow allows the shaft 424 to pass therethrough concentrically so that the torque sensor is constrained by the stop member 428 on one end and cams 412 on the other end (see FIG. 4E). As understood in the art, the torque sensor 438 may include strain gauges that are electrical elements that are adhered to or otherwise fastened to the hollow tube of the torque sensor 438 to sense differential rotation between the ends of the torque sensor 438 as constrained by the stop member 428 and cams 412. In sensing the differential rotation, a voltage is generated across the strain gauges that is proportional to the torque being applied.

A bearing support member 440 may be configured to provide the shaft 424 with minimum rotational friction so that the operator may rotate the hand grips 408 smoothly and with minimal hysteresis to enable the operator to make transitions in rotational direction, especially in the vicinity of the zero position, and have the hand controller 400 track the transition with minimal dead zone or movement without being sensed. The bearing support member, in one embodiment, may have part number 204PP, MPB light 200K series and use New Hampshire ball bearings. It should be understood that the bearing support member 440 may be configured to utilize a variety of different bearings that provide for minimal friction that produces minimal stiction, hysteresis, or friction. The bearing support member 440 may be connected to the chassis 410, thereby maintaining the bearing support member 440 in a fixed position. Additional bearing support members 440 may be included along the shaft 424, such as near the right hand grip 408R, which is not shown in this view of the hand controller 400.

The hand controller 400 may also include cams 442a and 442b (collectively 442) that are aligned in a perpendicular direction from that of the cams 412. The cams 442 are azimuth cams in that they are rotated as the operator rotates the hand controller 400 in an azimuth direction in a similar manner as an automobile steering wheel being rotated. Leaf-spring 444 may be formed of a pair of leaf-springs 444a and 444b (FIG. 4C) that are connected at a base end to a base portion 446 of the cams 442 with fasteners 448. The leaf-spring 444 may be prevented from rotating in the azimuth direction at tip end 450 by a spring-stop 452 that is formed of extension members 454a and 454b (collectively 454) and, optionally, a revolving member 456 that extends between the extension members 454. The revolving member 456 reduces friction and wear of the leaf-spring 444 or an alternative fixed member that the leaf-spring 444 would otherwise contact. In one embodiment, there is no preloading to avoid an unequal force or bias at zero degrees.

In operation, as the operator rotates the hand controller 400 in an azimuth direction, the hand controller 400 revolves around a shaft (not shown) that extends longitudinally through the hand controller 400. As the hand controller 400 revolves around the shaft, the cams 442 and leaf-spring 444 remain fixed with respect to the shaft and the spring-stop 452 presses against the leaf-spring 444. In this configuration, since there are two leaf-springs that form the leaf-spring 444, one of the leaf-springs that form the leaf-spring 444 is bent, thereby resisting rotation of the hand controller 400. A torque sensor 458 is engaged or connected to a stop member, which is connected to the shaft extending longitudinally through the hand controller 400, on one end and connected to the cams 442 on the other end senses a rotational torque in the same or similar manner as that of the torque sensor 438 along the elevation direction. As shown, the cams 442 and leaf-spring 444 are both wider than the cams 412 and leaf-spring 416 as additional resistance is utilized to resist rotation due to an operator being able to apply more torque to the hand controller 400 in the azimuth direction than the elevation direction as the operator may apply arm and shoulder forces to the hand controller 400 in the azimuth direction.

A mount 462 may be connected to the chassis 410. The mount 462 may be a metallic or other material that is stiff enough to prevent motion other than rotational motion of the hand controller 400. The mount 462 may define openings 464 that are threaded or not threaded to enable the mount 462 to be connected to another surface, such as a wall within a personnel carrier (e.g., tank).

The hand controller 400 may also include an electronics circuit board 466 that is configured to transceive signals to and from the controller interface 406 and torque sensors 438 and 458. The electronics circuit board 466 may be mounted to the chassis 410 via standoffs 468, as understood in the art. An electrical connector 470 that is configured to distribute electrical signals to and from the electronics circuit board 466 to the electromechanical gimbals, sensors, electronic display, and other electronic devices, as understood in the art. A cap or cover 472 may be used to protect the electrical connector, and a lanyard or other umbilical means 474 may connect the cover 472 to the lower housing 404 to prevent the cover 472 from becoming lost or separated from the hand controller 400.

Figure 4C:
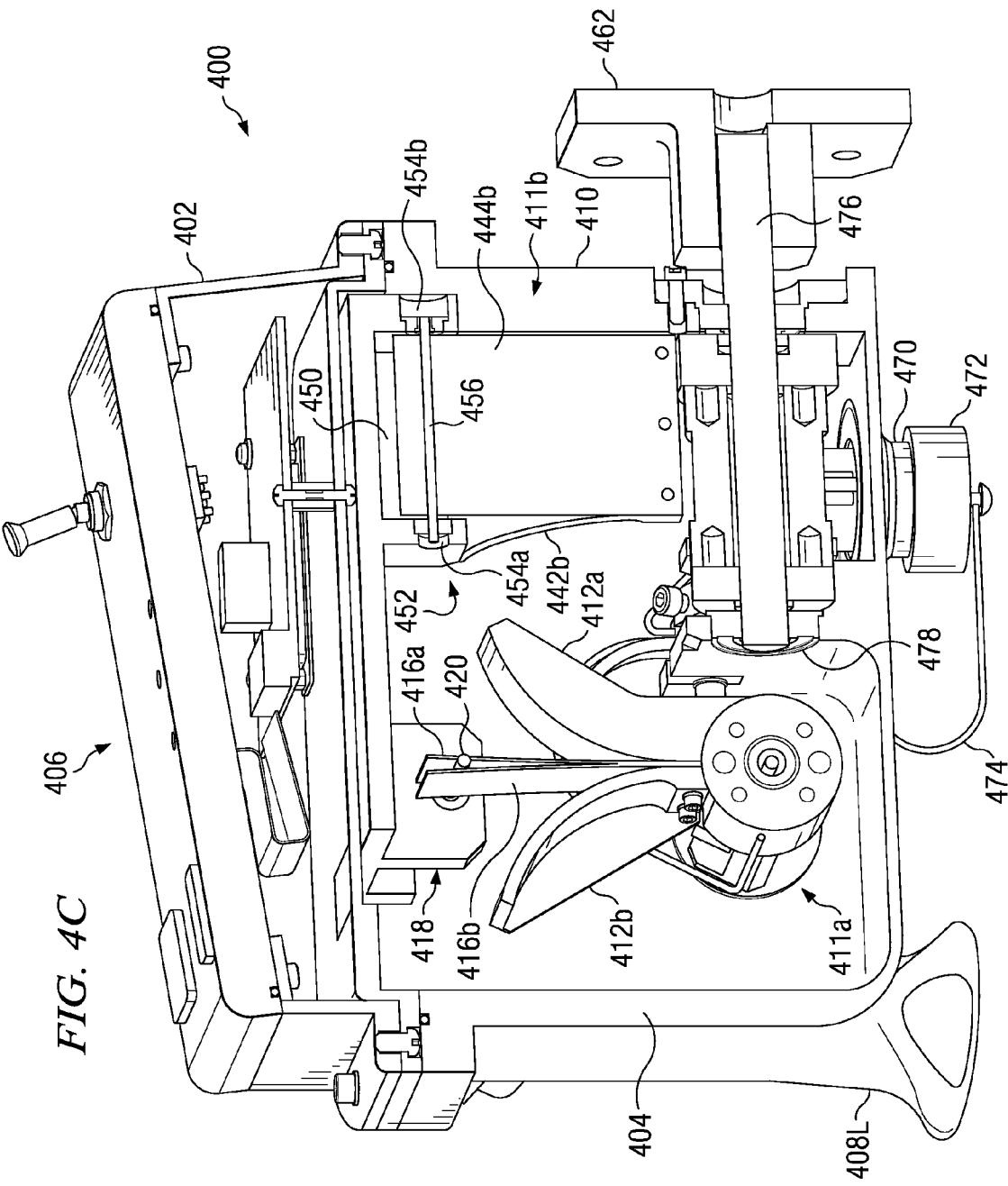
FIG. 4C is a side view of illustrative internal components of the hand controller of FIG. 4A.

With regard to FIG. 4C, a cross-sectional view of the hand controller 400 is shown. The cross-sectional view is a deeper slice into the hand controller 400 than that of FIG. 4B. In this view, the cross-sectional view is cut through azimuth shaft 476, which extends longitudinally through the hand controller 400. The shaft 476 extends into the mount 462 and may be secured thereto on a first end, and a second end of the shaft 476 is supported by a bearing support member 478. The bearing support member 478 is coupled to the chassis 410 that enables the operator to rotate the chassis 410 about the azimuth shaft 476. Also shown in this view is one of the leaf-springs of the azimuth leaf-spring 444 that is connected to the cams 442 (only cam 442b being shown) and a tip end 450 of the leaf-spring past the rotational member 456. When the leaf-spring 444b is rotated into the rotational member 456 of the spring-stop 452, the leaf-spring 444b bends in a non-linear manner due to the cam 442b pressing into the leaf-spring 444b when rotated and creating different length moment arms as the outer surface of the cam is curved. The non-linear curvature of the cam causes a non-linear displacement and torque resistance by the leaf-spring 444b.

The leaf-spring 416 used to prevent the cams 412 from rotating in the elevation path is shown to have the first and second leaf-springs 416a and 416b on opposite sides of the rotational member 420 of the spring-stop 418. By having each of the leaf-springs 416a and 416b on both sides of the spring-stop 418, a force or resistance is continuously applied, whether the cam 412a or 412b rotates into the leaf-spring 416a or 416b, respectively. Using multiple leaf-springs to form a collective leaf-spring also removes "free play" around a center or zero degree position and enables the leaf-spring to maintain resistive force during change in rotation direction and through the zero degree position. In other words, as the operator of the hand controller 400 changes direction of the elevation using hand grips 408, at least one of the leaf-springs 416 remain engaged, thereby minimizing any dead zone, hysteresis, stiction, or any other transition artifact that could cause inefficiency or loss of data when the operator transitions from one direction to another. The same or analogous configuration of the azimuth leaf-spring 444 and rotational member 456 is utilized to minimize directional transitions in the azimuth axes as is provided in the elevation axes by the cam/spring mechanism 411a, which includes the cams 412, leaf-spring 416, and spring-stop 418.

Figure 4D:
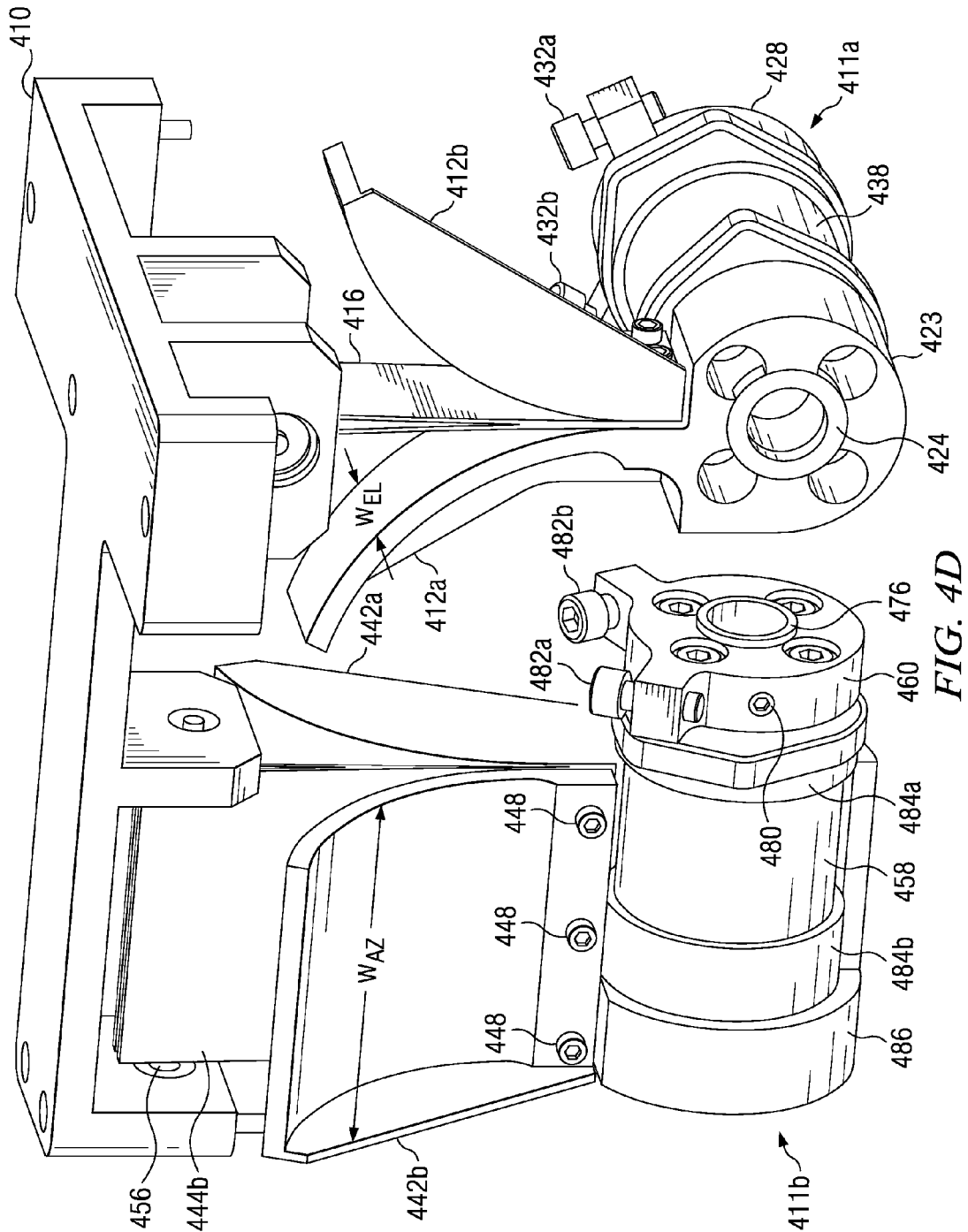
FIG. 4D is an illustration of a cam/spring mechanism utilized in the hand controller of FIG. 4A.

With regard to FIG. 4D, chassis 410 and cam/spring mechanisms 411 are shown. The elevation cams 412 have a width of $W_{EL}$, while the elevation cams 442 have widths $W_{AZ}$.

As previously described, the difference in widths of the cams 412 and 442 are to reflect that torque applied by the operator in the elevation direction is generally less than that in the azimuth direction due to the elevation torque being applied by the operator's wrists and the torque applied in the azimuth direction is applied by the operator's arms and shoulders. In an alternative configuration, rather than having different widths, different thicknesses and/or lengths L may be utilized to provide different torque resistances in the azimuth and elevation directions, thereby providing higher torque resistance in the azimuth direction than the elevation direction. As more clearly shown, the azimuth cam/spring mechanism 411b includes the shaft to which stop member 460 is connected. A set screw 480 extends through the stop member 460 and into the shaft 476 using screw threads or otherwise to prevent slippage between the stop member 460 and shaft 476. Stop members 482a and 482b (collectively 482) may be adjusted to set a maximum rotation of the shaft 476 in the same manner as described with regard to the stop members 432 in FIG. 4B. Torque sensor 458 is shown to be connected to the stop member 460 via flange 484a and base portion 486 of the cams 442 via flange 484b of the torque sensor 458. Although not shown, bearing support member 478 may also be part of the cam/spring mechanism 411b. The cam/spring mechanism 411a has the same or analogous configuration as that of cam/spring mechanism 411b with the exception of dimensions of the cams 412 and leaf-spring 416, in particular the widths of the cams 412 and leaf-spring 416.

Figure 4E:
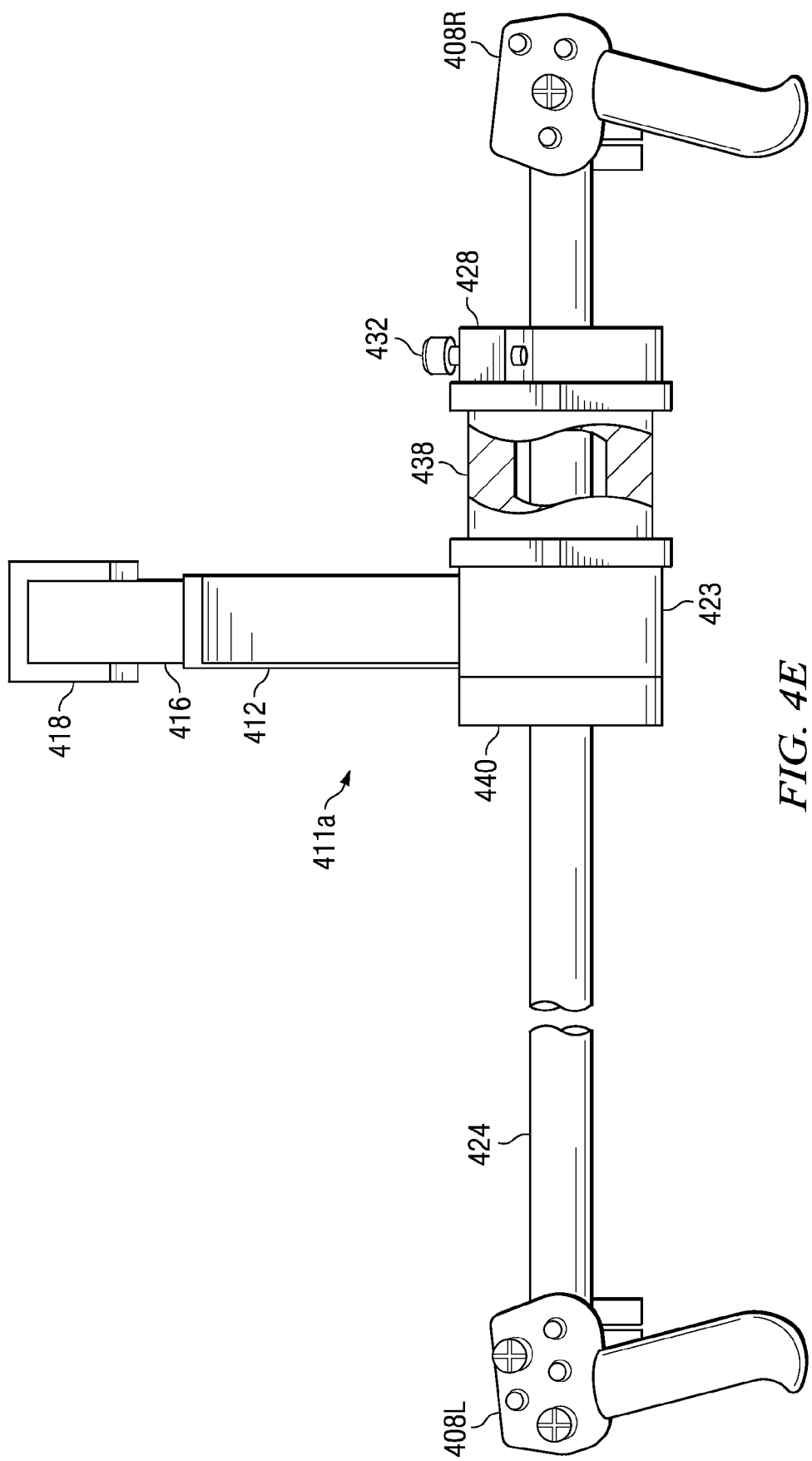
FIG. 4E is an illustration of handgrips, connecting shaft, and cam/spring mechanism of FIGS. 4A-4D.

With regard to FIG. 4E, an illustration of handgrips 408, shaft 424, and cam/spring mechanism 411a of FIGS. 4A-4D for controlling elevation of a sensor is shown. The handgrips 408L and 408R are connected by shaft 424 so that the two handgrips 408 are locked with respect to one another. The stop member 428 is affixed to the shaft 424 by a set screw (not shown), adhesive, or otherwise, as described herein. The torque sensor 438, which is hollow, is connected on one end to the stop member 428 and on the other end to the base portions 423 of the cams 412. The base portions 423 of the cams 412 may also be connected to a rotatable portion of the bearing support member 440, which may be connected to the chassis (not shown) of the hand controller, and provides for support and minimal friction for rotation of the shaft 424 and cams 412 with respect to the shaft 424. In an alternative embodiment, the bearing support member 440 may be a bearing support member that is supported by the shaft 424 and connects to the cams 412 without being connected to the chassis. Another bearing support member (not shown) may be located between the stop member 428 and the right hand grip 408R to support the shaft 424. The leaf-spring 416, which is connected to the base portion 423 of the cams 412, is prevented from freely rotating by the spring-stop 418. The configuration shows that the torque sensor 438 is constrained on both ends, on one end by the stop member 428 and the other end by the spring-stop 418 via the cams and leaf-spring 416, thereby causing the torque sensor 438 to generate a substantially mathematically proportional rate command to drive an electro-optical sensor (not shown) or other mechanism. While the configuration of FIG. 4E is shown for controlling elevation of the sensor is shown, the same or analogous configuration for controlling azimuth of the sensor may be utilized for cam/spring mechanism 411b of FIGS. 4B-4D.

Figure 5:
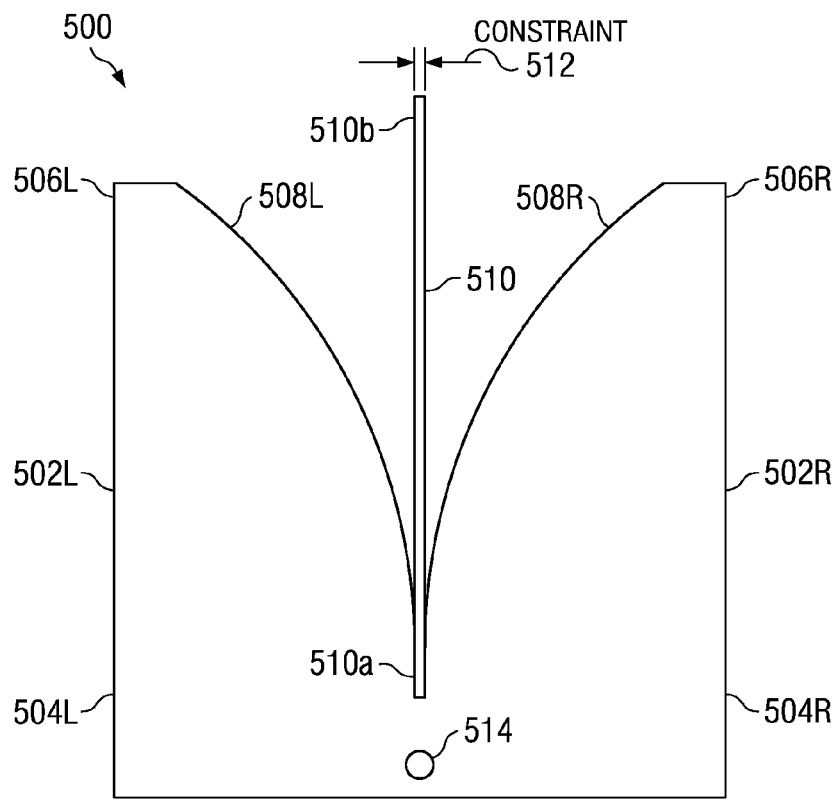
FIG. 5 is an illustration of an illustrative cam/spring mechanism model that provides for mathematically proportional rate commands and non-linear displacement feedback in response to torque input from an operator.

With regard to FIG. 5, an illustrative cam/spring mechanism solid model 500 is shown to describe technical operation thereof. The model 500 includes a left cam 502L and right cam 502R have a lower portions 504L and 504R, respectively, and left tip end 506L and right tip end 506R, respectively.

Each of the cams 502L and 502R have a curved outer surface 508L and 508R, respectively. The curved outer surfaces 508L and 508R may have a circular shape or profile. Alternatively, a different shape may be utilized. A leaf-spring 510 may have a first (base) end 510a and second (tip) end 510b, whereas the first end 510a may be connected to each of the lower portions or base portions of 504L and 504R of the cams 502L and 502R. By connecting the first end 510a of the leaf-spring 510 to the base portions 504L and 504R of the cams 502L and 502R, as the cams 502L and 502R rotate, the leaf-spring remains connected to the cams 502L and 502R and one of the curved outer surfaces 508L or 508R presses against the leaf-spring 510. A constraint 512, such as a spring-stop, may cause the second end 510b of the leaf-spring 510 to resist from freely rotating, such that as one of the curved outer surfaces 508L or 508R presses against the leaf-spring 510, a moment arm, which is a length of the leaf-spring that is free to rotate, causes a resistance force to be created against the curved outer surface 508L or 508R that is pressing against the leaf-spring 510. The moment arm shortens as the rotation of the cams 502L and 502R increases, thereby causing a non-linear increase in displacement and resistance of the torque. Because of the curved outer surfaces 508L and 508R being non-linear, the moment arm of the leaf-spring 510 shortens in a non-linear manner according to the shape of the curved outer surfaces 508L and 508R. A pivot point 514 is set in line with the leaf-spring 510 and may be centered within a shaft (not shown) to which the cams 502L and 502R are connected. Although shown as a single element, the leaf-spring 510 may be formed of multiple leaf-springs, as shown and described in FIGS. 4A-4D.

In one embodiment, the shape of the curved outer surface 508L and 508R of the cams 502L and 502R is a circular arc with a radius such that the curvature or bending radius is the same as the maximum bending radius of the leaf-spring 510 when at a maximum of unconstrained motion. By establishing this curvature, maximum stress of the leaf-spring 510 is controlled, thereby distributing the stress uniformly as the leaf-spring 510 is pushed to its maximum position. Design parameters of the leaf-spring 510 may include length of spring (inches), allowable stress (pounds per square inch (psi)), slope of torque versus displacement curve in a linear region (in-lb/rad), offset of pivot point from point of spring constraint (inches). Design parameters may also include leaf-spring material and dimensions of the leaf-spring 510. The dimensions may include width of the spring, spring thickness and radius of arc of the curved outer surfaces 508L and 508R of the cams 502L and 502R. In one embodiment, spring steel is used for the leaf-spring. Two equations may be utilized to compute (i) maximum stress of leaf-spring 510 and (ii) contact force of leaf-spring 510 to assist in selecting components to design the cam/spring mechanisms.

Maximum Stress Equation $$\sigma_{max} = \left[\frac{3 \cdot E \cdot t}{2 \cdot L^2}\right] \cdot d$$

Contact Force Equation $$F = \left[\frac{E \cdot w \cdot t^3}{4 \cdot L^3}\right] \cdot d$$

where E is elastic modulus of the leaf-spring material,
t is the thickness of the leaf-spring,
L is the length of the leaf-spring,
W is the width of the leaf-spring, and d is the distance of bend of an unconstrained tip and 510b of the leaf-spring 510.

Because, as previously described, an operator may apply input torque to the hand controller at different levels between the azimuth direction and the elevation direction, the azimuth cam/spring mechanism may be configured to provide a higher resistive torque feedback to the operator by having the cam and leaf-spring components with different dimensions. For example, in one embodiment, the leaf-spring elastic modulus constants may be 32 in-lbs/rad for elevation and 75 in-lbs/rad for the azimuth leaf-spring. The design of the cam/spring mechanisms may provide for a 100 micro-radian per second (grad/sec) control around center or boresight to 60°/sec at a 25° angular displacement, which is not possible to achieve using linear angular displacement.

Figure 6:
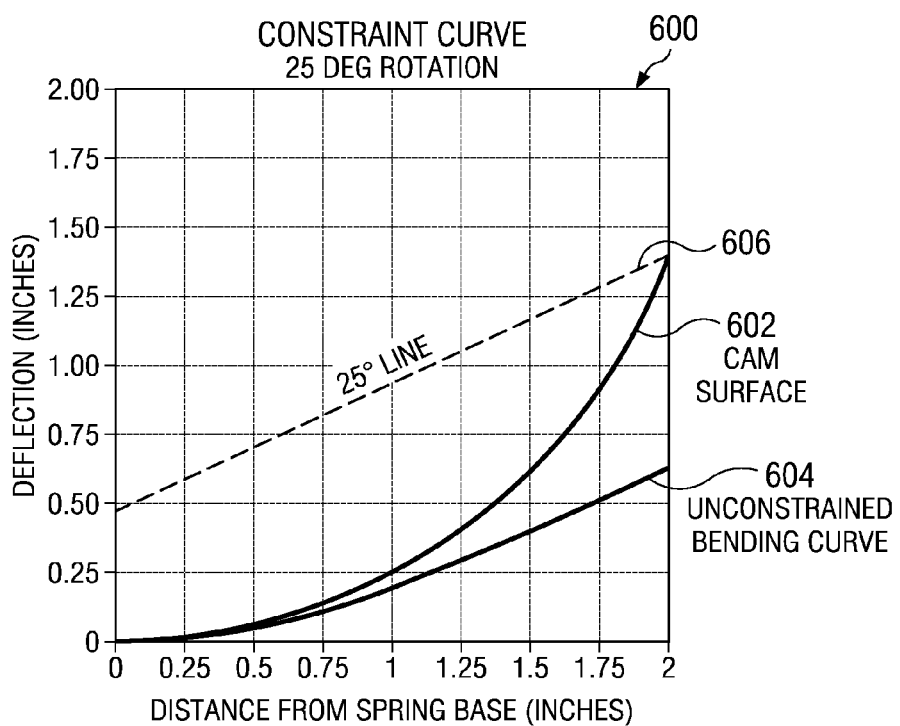
FIG. 6 is a graph showing an illustrative cam surface versus deflection curve.

With regard to FIG. 6A, an illustrative azimuth leaf-spring 600 is shown. In this embodiment, the leaf-spring 600 may have a width W of 1.980 inches and a length (L) of 2.97 inches. As shown in FIG. 6B, in addition, the leaf-spring 600 may have a thickness (t) of 0.025 inches. Openings 602a-602c may be formed in the leaf-spring to enable the leaf-spring to be connected to cams through the use of screws, bolts, or other fasteners.

With regard to FIG. 7A, an illustrative elevation leaf-spring 700 is shown to have a width (W) of 0.82 inches and length (L) of 2.97 inches. As shown in FIG. 7B, thickness (t) of the elevation leaf-spring 700 may be 0.025 inches. Returning to FIG. 7A, two openings 702a and 702b may be disposed at an end of the elevation leaf-spring 700 so as to be attached to cams in the hand controller. It should be understood that the principles of the present invention provide for a wide range of parameters of the azimuth and elevation leaf-springs 600 and 700 that are capable of providing non-linear displacement responses to an operator using the hand controller. In accordance with FIG. 2, one such design may produce a substantially linear torque between zero and 17 degrees of angular displacement with a torque of up to 15 in-lbs. Alternative torque versus angular displacement curves may be utilized as design criteria for selecting parameters of the cam/spring mechanisms.

Figure 8:
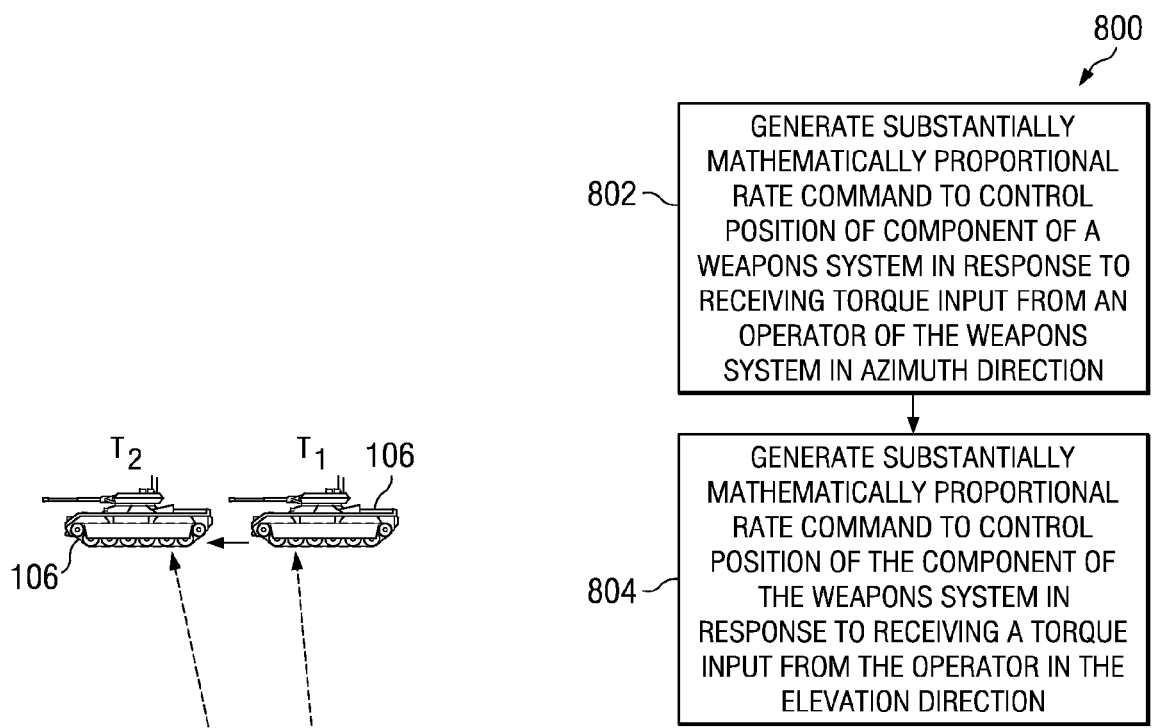
FIG. 8 is a flow diagram of an illustrative process for a hand controller in providing control of a sensor of a weapons system.

With regard to FIG. 8, an illustrative process 800 for remotely controlling a component of a weapons system using a hand controller is provided. At step 802, a substantially mathematically proportional rate command may be generated to control position of the component of the weapons system in the azimuth direction in response to receiving a torque input from an operator of the weapons system in the azimuth direction. At step 804, in response to receiving a torque input from the operator in the elevation direction, a substantially mathematically proportional rate command may be generated to control position of the component of the weapons system in the elevation direction. The hand controller may respond to the torque inputs by the operator by providing a non-linear position displacement response in both the azimuth and elevation directions. In one embodiment, the non-linear position displacement responses may be generated using cam/spring mechanisms. The substantially mathematically proportional rate commands may be generated using torque sensors.

With regard to FIG. 9, a flow chart of an illustrative process 900 for manufacturing a hand controller is shown. The process 900 starts at step 902, where a chassis is provided. The chassis may be composed of metal or other sufficiently rigid material. At step 904, multiple bearing assemblies may be attached to the chassis. A first shaft may be engaged with a first bearing assembly at step 906. The first shaft may be oriented to traverse in a first direction, and a second shaft may be engaged with a second bearing assembly at step 908, where the second shaft may be oriented to traverse in a second direction perpendicular to the first direction.

At step 910, a first leaf-spring having a first and a second end may be provided. At step 912, first pair of cams may be provided, where each of the first cams have a curved outer surface being a mirror image of the other. In being a mirror image, the cams may have a mirror image to a certain point that is a maximum angle at which the cams are designed to function. The first pair of cams each have a base end and a tip end. The first end of the first leaf-spring may be connected between the base ends of the first cams at step 914, thereby sandwiching the first leaf-spring between the base ends of the first pair of cams. A second leaf-spring may be provided at step 916, where the second leaf-spring has a first end and a second end. A second pair of cams may be provided at step 918, where each of the second pair of cams may have a curved outer surface being a mirror image of the other. The second pair of cams each have a base end and tip end. At step 920, the first end of the second leaf-spring may be connected between the base ends of the second cams, thereby sandwiching the second leaf-spring between the base ends of the second pair of cams.

At step 922, the base ends of the first pair of cams may be affixed to the first bearing assembly, and the base ends of the second pair of cams may be affixed to the second bearing assembly at step 924. At step 926, a first end of a first torque sensor may be engaged to the first shaft and a second end of the first torque sensor may be engaged to the base ends of the first pair of cams. In engaging the first torque sensor to the first shaft, the first torque sensor may be directly or indirectly engaged. If indirectly engaged, the first end of the torque sensor may be connected to another component, such as a stop member, that is directly engaged with or affixed to the first shaft. At step 928, a second end of a second torque sensor may be engaged to the second shaft and a second end of the second torque sensor may be engaged to the base ends of the second pair of cams at step 928.

At step 930, a first spring-stop may be connected to the chassis, where the first spring-stop is aligned with the second end of the first leaf-spring to cause the second end of the first leaf-spring to contact the first spring-stop and bend the first leaf-spring in a non-linear manner when the operator rotates the first shaft with respect to the chassis. In connecting the first spring-stop to the chassis, a portion of the first spring-stop may be part of the chassis. At step 932, a second spring-stop may be connected to the chassis, where the second spring-stop is aligned with the second end of the second leaf-spring to contact the second spring-stop and bend the second leaf-spring in a non-linear manner when the operator rotates the chassis with respect to the second shaft. At step 934, a pair of handgrips may be connected to the first shaft to enable an operator to rotate the first shaft with respect to the chassis and the chassis with respect to the second shaft, where the rotation causes the first and second torque sensors to generate respective substantially mathematically proportional rate command signals. The connection of the handgrips may be directly or indirectly connected to the shaft. If indirectly connected to the shaft, the handgrips may be connected to another component, such as a stop member, that is connected to the shaft.

While the cam/spring mechanisms 411 provide for non-linear displacement in response to torque input, it should be understood that alternative mechanisms may be utilized in accordance with the principles of the present invention. For example, a direct lever with helically-wound coil springs may be utilized, as understood in the art.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A hand controller for controlling an electro-optical sensor of a weapons system, said hand controller comprising:
   a chassis;
   an azimuth shaft;
   an elevation shaft;
   a first leaf-spring having a first end and a second end;
   a first pair of cams including base ends and tip ends, each of said first pair of cams having a curved outer surface that is a mirror image of the other, said first pair of cams being configured with each of the respective curved outer surfaces being in opposition with one another when the base ends are fastened to the first end of said first leaf-spring, thereby clamping the first end of said first leaf-spring between the cams and extending said first leaf-spring between the curved outer surfaces of said first pair of cams;
   a first spring-stop connected to said chassis and positioned at the second end of said first leaf-spring to apply a rotational force to the second end of said first leaf-spring, thereby causing said first leaf-spring to bend in response to rotation of said chassis with respect to said azimuth shaft;
   a first torque sensor fastened to said azimuth shaft and said first pair of cams to sense rotational force applied by an operator to said azimuth shaft with respect to resistance from said first leaf-spring, and to generate a first rate command signal;
   a second leaf-spring having a first end and a second end;
   a second pair of cams including base ends and tip ends, each of said second pair of cams having a curved outer surface that is a mirror image of the other, said second pair of cams being configured with each of the respective curved outer surfaces being in opposition with one another when the base ends are fastened to the first end of said second leaf-spring, thereby clamping the first end of said second leaf-spring between the cams and extending said second leaf-spring between the curved outer surfaces of said second pair of cams;
   a second spring-stop connected to said chassis and positioned at the second end of said leaf-spring to prevent rotation of said second leaf-spring, thereby causing said second leaf-spring to bend in response to rotation of said elevation shaft with respect to said chassis; and
   a second torque sensor fastened to said elevation shaft and said second pair of cams to sense rotational force applied by an operator to said elevation shaft with respect to resistance from said second leaf-spring, and to generate a second rate command signal, the first and second rate command signals being utilized to control position of the electro-optical sensor of the weapons system.

2. The hand controller of claim 1, further comprising:
   a first set of bearings engaging said azimuth shaft to provide low friction rotation of said azimuth shaft, said first pair of cams being connected to said first set of bearings; and
   a second set of bearings engaging said elevation shaft to provide low friction rotation of said elevation shaft, said second pair of cams being connected to said second set of bearings.

3. The hand controller of claim 1, further comprising a pair of hand grips configured to enable a user to apply a rotational force in both azimuth and elevation directions, wherein rotational force in the azimuth direction causes said chassis to rotate about said azimuth shaft and rotational force in the elevation direction causes the elevation shaft to rotate with respect to said chassis.

4. The hand controller according to claim 1, wherein the first and second rate command signals are substantially mathematically proportional rate command signals with respect to torque input.

5. The hand controller according to claim 1, wherein said first and second spring-stops include at least one bearing that is free to rotate when a force is applied to the at least one bearing by said first and second leaf-springs.

6. The hand controller according to claim 1, wherein each of said first and second leaf-spring is formed of a pair of leaf-springs.

7. The hand controller according to claim 6, wherein each leaf-spring of the two pair of leaf-springs is positioned on opposite sides of said first and second spring-stops, respectively.

8. The hand controller according to claim 1, wherein the curved outer surfaces of the cams have a radius that is circular.

9. The hand controller according to claim 1, further comprising a first stop member coupled to said azimuth shaft and a second stop member coupled to said shaft, wherein each stop-member is configured to limit rotation of each respective shaft to a respective predetermined maximum number of degrees.

10. The hand controller according to claim 1, wherein said first leaf-spring is wider than said second leaf-spring.

11. A method for remotely controlling a component of a weapons system using a hand controller, said method comprising:
   in response to receiving a torque input from an operator of the weapons system in the azimuth direction, generating a substantially mathematically proportional rate command to control position of the component of the weapons system in the azimuth direction; and
   in response to receiving a torque input from the operator in the elevation direction, generating a substantially mathematically proportional rate command to control position of the component of the weapons system in the elevation direction, the hand controller responding to the torque inputs by the operator by providing a non-linear position displacement response in both the azimuth and elevation directions;
   wherein generating the substantially mathematically proportional rate commands is performed by torque sensors sensing the torque input from the operator.

12. The method according to claim 11, wherein the non-linear position displacement response is caused by a pair of cams in opposed orientation with respect to one another bending a leaf-spring secured between the pair of cams in response to the operator applying the torque inputs to rotate the hand controller.

13. The method according to claim 11, further comprising preventing the operator from rotating the hand controller in both the azimuth and elevation directions beyond a predetermined number of degrees.

14. The method according to claim 11, further comprising driving a sensor to rotate in both azimuth and elevation directions in response to the substantially mathematically proportional rate commands being non-zero.

15. A method of manufacturing a hand controller, said method comprising:
providing a chassis;
attaching a plurality of bearing assemblies to the chassis;
engaging a first shaft with a first bearing assembly, the first shaft being oriented to traverse in a first direction;
engaging a second shaft with a second bearing assembly, the second shaft being oriented to traverse in a second direction perpendicular to the first direction;
providing a first leaf-spring having a first and a second end;
providing a first pair of cams, each of the first cams having a curved outer surface being a mirror image of the other, the first pair of cams each having a base end and a tip end;
connecting the first end of the first leaf-spring between the base ends of the first cams, thereby sandwiching the first leaf-spring between the base ends of the first pair of cams;
providing a second leaf-spring having a first end and a second end;
providing a second pair of cams, each of the second pair of cams having a curved outer surface being a mirror image of the other, the second pair of cams each having a base end and tip end;
connecting the first end of the second leaf-spring between the base ends of the second cams, thereby sandwiching the second leaf-spring between the base ends of the second pair of cams;
affixing the base ends of the first pair of cams to the first bearing assembly;
affixing the base ends of the second pair of cams to the second bearing assembly;
engaging a first end of a first torque sensor to the first shaft and a second end of the first torque sensor to the base ends of the first pair of cams;
engaging a first end of a second torque sensor to the second shaft and a second end of the second torque sensor to the base ends of the second pair of cams;
connecting a first spring-stop to the chassis, the first spring-stop being aligned with the second end of the first leaf-spring to cause the second end of the first leaf-spring to contact the first spring-stop and bend the first leaf-spring in a non-linear manner when the operator rotates the first shaft with respect to the chassis;
connecting a second spring-stop to the chassis, the second spring-stop being aligned with the second end of the second leaf-spring to contact the second spring-stop and bend the second leaf-spring in a non-linear manner when the operator rotates the chassis with respect to the second shaft; and
connecting a pair of handgrips to the first shaft to enable an operator to rotate the first shaft with respect to the chassis and the chassis with respect to the second shaft, the rotation causing the first and second torque sensors to generate respective substantially mathematically proportional rate command signals.

16. The method according to claim 15, wherein providing the first and second leaf-springs includes providing a pair of leaf-springs for each of the first and second pair of leaf-springs.

17. The method according to claim 16, wherein connecting the first and second spring-stops includes connecting a rotational member between each of the pair of leaf-springs of each of the first and second leaf-springs.

18. The method according to claim 15, further comprising connecting a mount to the chassis to affix the chassis in a fixed position with respect to another structure.

19. The method according to claim 15, wherein said first and second leaf-springs have different dimensions.

20. A hand controller for controlling an electro-optic sensor of a weapons system, said hand controller comprising:
a first cam/spring mechanism configured to provide non-linear displacement to an operator applying a torque to rotate the hand controller in a first direction;
a second cam/spring mechanism configured to provide non-linear displacement to an operator applying a torque to rotate the hand controller in a second direction;
wherein the first direction is an azimuth direction and the second direction is an elevation direction, and wherein said first cam/spring mechanism provides a higher resistance than said second cam/spring mechanism;
a first sensor configured to sense torque being applied in the first direction and to generate a command signal to control rotation of the electro-optic sensor in the first direction; and
a second sensor configured to sense torque being applied in the second direction and to generate a command signal to control rotation of the electro-optic sensor in the second direction.

21. The hand controller according to claim 20, wherein said first cam/spring mechanism includes a pair of cams, leaf-springs and first spring-stop that stops a second end of the leaf-spring from rotating, wherein the pair of cams sandwich a first end of the leaf-spring and wherein that rotation of the first pair of cams causes one of the cams to press into the leaf-spring to cause the leaf-spring to bend in a non-linear manner as a function of the shape of the cam and dimensions of the leaf-spring.

22. The hand controller according to claim 20, wherein the command signal is a substantially mathematically proportional rate command.

* * * * *